: 3,074,967
STABILIZATION OF TETRAHYDROFURAN
William O. Brillhart, Fredericksburg, Va., assignor to American Viscose Corporation, Philadelphia, Pa., a corporation of Delaware
No Drawing. Filed Apr. 12, 1960, Ser. No. 21,594
4 Claims. (Cl. 260—346.1)

This invention relates to an oxidation stabilized liquid cyclic ether and a method for stabilizing said ether. More particularly the invention relates to the stabilization of tetrahydrofuran and similar cyclic ethers against the formation of oxides or peroxides in storage.

Additives for the stabilization of cyclic ethers, for example tetrahydrofuran and furan, against oxidation in storage are well known. Hydroquinone, p-cresol, pyridine, substituted phenols, hydrazine and substituted tertiary diamines are all known anti-oxidants and peroxide inhibitors for cyclic ethers. These known anti-oxidants tend to prevent the build up of harmful peroxides in the liquid ether during storage. However, they have not been found to be effective in destroying peroxides that may have formed before addition of the stabilizing additive. In situations where peroxide formation can occur before the addition of a stabilizer, for example, where the cyclic ether is recovered by distillation in a solvent recovery procedure, it is important to rid the material of the harmful and dangerous peroxide.

It is an object of this invention to provide an effective oxidation inhibitor for a liquid cyclic ether.

It is a further object of this invention to provide a method for destroying any peroxides formed in a liquid cyclic ether and thereafter inhibiting the formation of further oxidation products.

In accordance with the present invention a liquid cyclic ether is effectively stabilized by preventing the formation of peroxides and by destroying any peroxides present therein by the incorporation of a small amount of an alkyl phosphite in the ether. The alkyl group or groups attached to the phosphite radical generally have from 1 to 18 carbon atoms and preferably from about 1 to 10 carbon atoms.

The amount of alkyl phosphite which is effective in stabilizing the liquid cyclic ether ranges from about 0.01 and up. It is preferred that from about 0.05 to about 0.5% by weight of the alkyl phosphite be incorporated in the cyclic ether to give a satisfactory margin of safety to prevent the formation of peroxides. In the case of tetrahydrofuran and similar saturated cyclic ethers, one mol of alkyl phosphite will react with 1 mol of formed peroxide to destroy the peroxide. The upper limit of the alkyl phosphite which is added to the cyclic ether is determined by the extent of peroxide formation therein.

Examples of alkyl phosphites which are useful for this invention include mono, di and trimethyl phosphites, mono, di and triethyl phosphites, mono, di and tripropyl phosphites, mono, di and triisopropyl phosphites, mono, di and tributyl phosphites, mono, di and triisobutyl phosphites, mono, di and triamyl phosphites, mono, di and triisoamyl phosphites, mono, di and trihexyl phosphites, mono, di and triheptyl phosphites, mono, di and trioctyl phosphites, mono, di and triisooctyl phosphites, mono, di and trinonyl phosphites, mono, di and tridecyl phosphites, mono, di and tridodecyl phosphites, mono, di and trihexadecyl phosphites and mono, di and trioctadecyl phosphites. The preferred alkyl phosphites for this invention are mono, di and triisopropyl phosphites, mono, di and tributyl phosphites, mono, di and triisobutyl phosphites, and mono, di and triisooctyl phosphites.

Liquid cyclic ethers which are stabilized in accordance with this invention include tetrahydrofuran, furan, dioxane, tetrahydropyran, pyran, etc. Tetrahydrofuran is an important solvent for the polymer coating of flexible film and it is a preferred material for stabilization in accordance with this invention.

The method of determining the effectiveness of the alkyl phosphites of this invention in destroying peroxides in a liquid cyclic ether is as follows. Tetrahydrofuran will be used in the following description to represent a liquid cyclic ether.

A sample of tetrahydrofuran which contains peroxides was obtained and the particular peroxide content was determined by pipetting 10 cc. of the tetrahydrofuran sample into an excess of potassium iodide in dilute sulfuric acid solution and allowing the sample to stand in the dark for 15 minutes after shaking well. After this period, 2 ml. of starch indicator was added and the sample titrated with a 0.1 normal sodium thiosulfate solution. By following this same procedure without the addition of tetrahydrofuran to the iodide-sulfuric acid solution the amount of peroxide in the sample is calculated from the obtained results. To prepare a calibration curve for peroxide determination in test samples a reagent was prepared by adding 1 ml. of titanium tetrachloride to 100 ml. of a 1:1 sulfuric acid solution with continuous stirring and diluting to 1 liter. 5 ml. of methanol and 15 ml. of the tetrachloride-sulfuric acid reagent were added to 5 ml. of a diluted portion of the above tetrahydrofuran sample. Another 5 ml. of methanol and 15 ml. of reagent were mixed separately as a blank. After standing for 10 minutes the blank and test sample were read on a Fisher Electrophotometer at 425 MU using micro-tubes. Thereafter all test samples were mixed with the reagent and read on the Electrophotometer. The peroxide content of test samples was then determined by reference to the established calibration curve.

The data shown in the following table demonstrate stabilization of tetrahydrofuran in accordance with the invention.

Table I

| Additive | Percent | Time, hrs. | Peroxide, p.p.m. |
|---|---|---|---|
| None | | 168 | 2,023 |
| Triisopropyl phosphite | .10 | 168 | 3 |
| Tributyl phosphite | .10 | 168 | 0 |
| Triisooctyl phosphite | .10 | 168 | 2.8 |
| Formaldehyde | .10 | 168 | 1,086 |
| Benzaldehyde | .10 | 168 | 783 |

The excellent stabilizing effect provided by the alkyl phosphites is well demonstrated in the above table. The peroxide destroying action of the alkyl phosphites in tetrahydrofuran is demonstrated by the data in the following table.

Table II

| Additive | Percent | Peroxide, p.p.m. | |
|---|---|---|---|
| | | Before treatment | After treatment |
| None | | 2,023 | |
| Triisooctyl phosphite | 0.4 | 2,023 | 1,062 |
| Triisopropyl phosphite | 0.4 | 2,023 | 7 |
| Formaldehyde | 0.4 | 2,023 | 1,950 |
| Benzaldehyde | 0.4 | 2,023 | 1,970 |

From the above data it is evident that the alkyl phosphites of the invention are extremely effective in destroying the harmful peroxide content of the cyclic ether. It is also apparent that the phosphites react stoichiometrically with the cyclic ether peroxide. Triisooctyl phosphite has a molecular weight of almost twice that of triisopropyl phosphite and thus destroys only about half of the amount of the peroxide which the same additive amount of the triisopropyl phosphite destroys.

Reducing agents tested, such as the formaldehyde and benzaldehyde shown in Tables I and II, were not appreciably effective in either stabilizing or destroying peroxides in the cyclic ether.

Various changes and modifications may be made in practicing the invention without departing from the spirit and scope thereof and, therefore, the invention is not to be limited except as defined in the appended claims.

I claim:

1. Tetrahydrofuran containing a peroxide inhibiting and destroying amount of an alkyl phosphite wherein the alkyl group contains from 1 to 18 carbon atoms.

2. Tetrahydrofuran containing from about 0.05 to about 0.5% by weight of a trialkyl phosphite wherein the alkyl groups have from 1 to 10 carbon atoms.

3. The method of inhibiting and destroying peroxides in tetrahydrofuran which comprises incorporating therein from about 0.01 to about 1.0% by weight of an alkyl phosphite wherein the alkyl groups have from 1 to about 18 carbon atoms.

4. A method of inhibiting and destroying peroxides in tetrahydrofuran which comprises incorporating therein from about 0.05 to about 0.5% by weight of a trialkyl phosphite wherein said alkyl groups have from 1 to about 10 carbon atoms.

No references cited.